United States Patent [19]

Sano et al.

[11] 4,118,467

[45] Oct. 3, 1978

[54] TREATMENT OF GAS CONTAINING HYDROGEN SULFIDE

[75] Inventors: Masaru Sano, Tokyo; Koji Kashima, Yokohama, both of Japan

[73] Assignees: Nittetu Chemical Engineering Ltd.; Toa Oil Co., Ltd., both of Tokyo, Japan

[21] Appl. No.: 887,364

[22] Filed: Mar. 16, 1978

[30] Foreign Application Priority Data

Mar. 24, 1977 [JP] Japan .................................. 52-31498

[51] Int. Cl.$^2$ ............................................. C01B 17/04
[52] U.S. Cl. .............................. 423/573 R; 423/226; 423/567 R; 423/571
[58] Field of Search ............... 423/226, 567, 571, 573, 423/5

[56] References Cited

U.S. PATENT DOCUMENTS

| | | | |
|---|---|---|---|
| 3,928,535 | 12/1975 | Schulz | 423/573 X |
| 3,959,452 | 5/1976 | Espenscheid et al. | 423/573 |
| 3,972,989 | 8/1976 | Fenton et al. | 423/573 |

*Primary Examiner*—G. O. Peters
*Attorney, Agent, or Firm*—Lane, Aitken, Dunner & Ziems

[57] ABSTRACT

An effluent alkali salt solution obtained in the desulfurization of a hydrogen sulfide-containing gas by washing with an alkali wash solution is subjected to a two stage precipitation treatment at different temperatures to recover valuable components such as a vanadium compound, chelating agent, ADA, and active alkali salts while removing inactive salts such as sulfate and thiosulfate.

7 Claims, 1 Drawing Figure

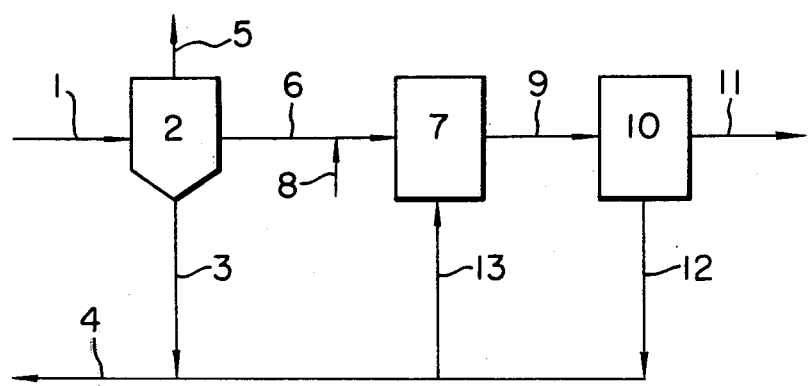

TREATMENT OF GAS CONTAINING HYDROGEN SULFIDE

BACKGROUND OF THE INVENTION

This invention relates to an improved process for the treatment of a gas containing hydrogen sulfide and, more particularly, to a method of recovering valuable substances contained in an effluent alkali salt solution diverted from an alkaline wash solution recirculating system in Stretford processes.

The Stretford processes using an alkali vanadate-ADA (sodium salts of the 2,6 and 2,7 isomers of anthraquinone disulfonic acid) system are now widely in operation. In such processes, gas containing hydrogen sulfide is washed with an alkaline wash solution containing sodium carbonate and bicarbonate to absorb the hydrogen sulfide, and the resulting hydrosulfide is oxidized to elemental sulfur by means of an alkali vanadate, with a simultaneous valence change of vanadium from five to four. The elemental sulfur is removed from the wash solution by, for example, floth flotation. The reduced vanadate is reoxidized by aerial oxygen in the presence of ADA. The regenerated wash solution is recycled to the absorption zone.

The chemistry of the process can be represented by the following equations:

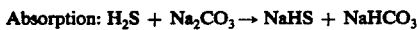

Absorption: $H_2S + Na_2CO_3 \rightarrow NaHS + NaHCO_3$

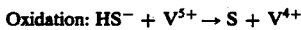

Oxidation: $HS^- + V^{5+} \rightarrow S + V^{4+}$

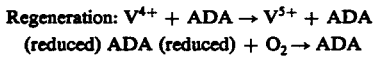

Regeneration: $V^{4+} + ADA \rightarrow V^{5+} + ADA$ (reduced)
ADA (reduced) + $O_2 \rightarrow$ ADA

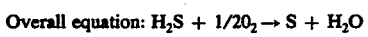

Overall equation: $H_2S + 1/2 O_2 \rightarrow S + H_2O$

Besides the principal reactions, a number of side reactions occur in the process to form the following inactive salts.

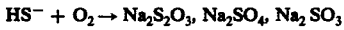

$HS^- + O_2 \rightarrow Na_2S_2O_3, Na_2SO_4, Na_2SO_3$

These inactive salts tend to accumulate in the recycled wash solution and excessive accumulation will cause precipitation of these salts together with ADA and vanadium compounds.

To cope with this problem, a portion of the recirculating wash solution is generally discarded and replaced with a fresh solution to control the content of these salts within a predetermined value which is sufficient to keep ADA dissolved in the recycling wash solution.

Such an effluent aqueous alkali salt solution discharged from the circulation system has, in general, the following composition.

| | | |
|---|---|---|
| ADA | 5 – 1 | g/l |
| V compd. | 5 – 1 | |
| Chelating agent | 4 – 1 | |
| NaHCO$_3$ | 5 – 30 | |
| Na$_2$CO$_3$ | 1 – 20 | |
| NaSCN | 3 – 1 | |
| Na$_2$SO$_4$ | 100 – 250 | } total 200 – 400 |
| Na$_2$S$_2$O$_3$ | 100 – 300 | |

Thus, the effluent contains substances useful in the oxidation and regeneration stages, i.e. ADA, vanadium compound, chelating agent, as well as active salts useful in the absorption stage, i.e., sodium carbonate and bicarbonate. Accordingly, it is disadvantageous to discard the effluent.

Several methods have been proposed to recover useful substances from such effluent. For example, in U.S. Pat. No. 3,941,875, there is disclosed a process wherein the effluent is subjected to submerged combustion at high temperature to convert inactive alkali metal salts into active salts. While this process is effective in recovering sodium and vanadium components, it is impossible to recover valuable components such as ADA and chelating agents.

A method is proposed in Japanese unexamined patent application (Tokkyo Kokai) No. 68995/1975, wherein the effluent salt solution is mixed with methanol to recover ADA, vanadium compounds and chelating agent. This method is, however, disadvantageous because a relatively large amount of methanol is consumed.

SUMMARY OF THE INVENTION

The present invention provides an improved process for treating a gas containing hydrogen sulfide, wherein the gas is washed with an alkali wash solution to absorb the hydrogen sulfide to form a solution containing hydrosulfide. The solution is oxidized with, preferably, pentavalent vanadium to convert the hydrosulfide into elemental sulfur while the pentavalent vanadium is reduced to quadrivalent vanadium which is thereafter reoxidized by oxygen in the presence of ADA. After removing the elemental sulfur, the residual salt solution containing secondarily produced sulfur compounds, ADA, vanadium compound and the like is recirculated for re-use as an absorbent. Since the concentration of the sulfur compounds would increase in the salt solution recirculating between the absorption zone and the oxidation zone with time, a portion of the salt solution is diverted to maintain the concentration of such by-products below a predetermined value. The improvement involves:

a first stage of concentrating at least a portion of said salt solution so as to form a concentrate having a sodium ion concentration of at least about 9 g.mol/Kg H$_2$O, allowing the disulfonate to precipitate from said concentration at a temperature of about 25° to 60° C. to form a first mixture, and separating said first mixture into a first solids rich phase containing said precipitated disulfonate and a first mother liquid phase; and a second stage of cooling said first liquid phase to a temperature not higher than 10° C. to allow the sulfur compounds to precipitate to form a second mixture, and separating said second mixture into a second solids rich phase containing said precipitated sulfur compounds and a second liquid phase.

While ADA, in the free acid form, has a relatively high solubility in water, the solubility of ADA in the form of sodium salt has been found to considerably decrease in the presence of the inactive by-product salts, such as sodium sulfate and thiosulfate, and the active salts, such as sodium carbonate and bicarbonate due to a common-ion effect. It has also been revealed that the solubility of ADA in such salt solution is not substantially influenced by temperature in the range of 0° to 40° C. Thus, as the salt solution containing ADA is concentrated and the temperature of the concentrate is lowered, the solubilities of ADA and sulfur compounds rapidly decrease, resulting in the precipitation of these substances. With further cooling the concentrate, however, the solubility of ADA has been found to increase, because the sodium ion concentration is decreased due to the decrease of the solubility of sulfur compounds which provide the common-ion. The present invention is based on the above findings.

According to the process of this invention, most ADA is recovered in the form of a solid in the first precipitation stage. By cooling the first liquid phase in the second precipitation stage, the by-product sulfur compounds are allowed to precipitate while most part of the ADA still remaining in the first liquid phase does not precipitate.

Since other useful substances contained in the salt solution, such as chelating agent, vanadium compound, sodium carbonate, sodium bicarbonate and etc., have relatively higher solubility than ADA, they are mainly contained in the second liquid phase.

The first solids rich phase and the second liquid phase may be advantageously recycled to the alkali wash solution recirculating system.

The whole of the process may be operated in a continuous matter.

Accordingly, it is an object of the present invention to provide a process for treating a hydrogen sulfide-containing gas which overcomes the disadvantages of the prior art processes.

It is a special object of the invention to provide a process which permits the recovery of ADA from an effluent salt solution obtained in the desulfurization of a gas stream in Stretford processes.

It is a further object of the invention to provide a process which prevents accumulation of sulfate and thiosulfate in the recycling wash solution in Stretford processes.

Other objects, features and advantages of the present invention will become more apparent from the detailed description to follow, taken in conjunction with the accompanying drawing.

BRIEF DESCRIPTION OF THE DRAWING

The sole FIGURE is a schematic flow chart illustrating an embodiment of the present invention.

DETAILED DESCRIPTION OF THE PREFERRED EMBODIMENTS OF THE INVENTION

According to the present invention, a portion of an alkali wash solution recirculating between an absorption zone and an oxidation zone in a Stretford process is diverted from a line 1 to maintain the concentration of inactive salts within a predetermined value. The amount of the diverted effluent salt solution may be determined in consideration of the production rate of the inactive salts in the desulfurization process. The salt solution, generally, has the composition shown previously and a sodium ion concentration of about 5 to 6 g-moles/Kg $H_2O$.

The salt solution is first introduced into a first precipitating zone, preferably a vacuum crystallizer 2. An example of such crystallizer is an evaporator having a forced circulation heat exchanger and having a bottom section arranged to function as a crystallizer.

In the first precipitation zone, the salt solution is concentrated to precipitate a greater part of ADA to form a first mixture from which a first mother liquid phase and a first solids rich phase are recovered through a line 6 and 3, respectively. The first liquid phase is then subjected to a second precipitation treatment at a lower temperature to remove the inactive salts therefrom. The vapor evaporated is withdrawn overhead from the evaporator through a line 5.

In order to effectively recover ADA, it is necessary to increase the sodium ion concentration in the salt solution to at least 9 g-moles/Kg $H_2O$ (9 gram-moles per one kilogram of water), preferably at least 10 g-moles/Kg $H_2O$. Since sodium sulfate also precipitates partially by the concentration, excess concentration is not advantageous. It is preferred that the degree of the concentration be determined with consideration of the production ratio between sodium sulfate and sodium thiosulfate in the desulfurization process as well as the temperature in the first and second precipitation treatments. The sodium ion concentration is practically not higher than 20 g-moles/Kg $H_2O$.

The first solids rich phase consisting of the precipitates including ADA and sodium sulfate, and the mother liquor entrained therewith, may be returned to the wash solution recirculating system through a line 4. It is preferred that the solids rich phase be entrained with as little of the mother liquor as possible for the reasons of economy. That is, when the amount of the mother liquor entrained with the precipitates increases, the amount of the liquid phase introduced into the second precipitation step correspondingly decreases, so that the absolute amount of the inactive salts removed by the second treatment falls below the predetermined value. Since the inactive salts are continuously produced in the wash solution recirculating system nearly at a constant rate, it becomes necessary to increase the amount of the effluent salt solution in order to remove the inactive salts in the predetermined amount at the second treatment stage, and to maintain the concentration of the inactive salts in the recirculating system within a predetermined value.

Because of the presence of sodium thiosulfate, sodium sulfate precipitating in the first precipitation zone is in the form of a fine particulate anhydrous salt even if the precipitation is effected at a temperature of 30° C. which temperature is lower than the transition point of the sodium sulfate. Therefore, the first mixture has relatively poor solid-liquid separability. Thus, while the recovery of the first solids rich phase from the first mixture may be performed by simply withdrawing a slurry of the precipitates accumulated at the bottom of the crystallizer, it is preferred that the mixture be forcedly separated into the solids rich phase and the liquid phase. For this purpose, a solid-liquid separator, such as a centrifugal device is suitably included in the vacuum separator.

The precipitation of the concentrated salt solution is performed at a temperature of at least 25° C. Since the second precipitation is conducted at a temperature lower than that employed in the first precipitation stage, too high a temperature at the first stage is not economical. For this reason, the temperature is generally not higher than 90° C., preferably not higher than 60° C. Most preferably, the precipitation is effected at a temperature of 30° to 40° C.

With a temperature lower than 25° C., the inactive salts will precipitate in an increased amount, resulting in the lowering of the yield in the second precipitation stage. This is disadvantageous because, as described above, the amount of the effluent salt solution to be treated must then be increased.

The major component in the first solids rich phase is anhydrous sodium sulfate. In a more preferred embodiment of this invention, the solids rich phase is washed with water in a small amount but sufficient to dissolve a substantial amount of ADA. By this, the sulfate can produce crystals of $Na_2SO_4 \cdot 10H_2O$. The sulfate is then removed and the residual liquid is introduced into the wash solution recirculating system. According to this embodiment, the concentration of sodium sulfate, which has a greater tendency to precipitate than the other inactive salts, in the recirculating wash solution is lowered. Consequently, it becomes possible to allow the concentration of sodium thiosulfate in the wash solution to increase up to the limit below which ADA does not precipitate. Accordingly, the amount of the effluent salt solution to be treated can be made smaller in comparison with the case where no such wash treatment of the first solid phase is conducted, enabling operation of the effluent salt solution treatment with a more compact apparatus.

The first mother liquid phase is withdrawn from the first precipitation zone and is fed through a line 6 to a second precipitation zone, preferably a cooling crystallizer 7, where the first liquid phase is cooled to a temperature lower than that in the first precipitation stage, thereby precipitating sodium thiosulfate and sodium sulfate. The lower limit of the crystallization temperature is, for reasons of economy, generally $-5°$ C. while the upper limit is, for reasons of efficiency, generally $10°$ C. Preferably the crystallization is effected at a temperature in the range of $0°$ to $5°$ C. As described above, because the sodium ion concentration decreases during the second precipitation stage, ADA does not precipitate even at such a low temperature. In the crystallizer 7, sodium sulfate and sodium thiosulfate precipitate as $Na_2SO_4 \cdot 10H_2O$ and $Na_2S_2O_3 \cdot 5H_2O$ in predetermined amounts to form a second mixture. The mixture is, through a line 9, introduced into a separator 10, where it is separated into a second solids rich phase and a second mother liquid phase. The solids rich phase is taken out through a line 11 and the mother liquid phase through 12.

Though the second solids rich phase generally includes mother liquor in an amount of about 10% based on the total weight of the solids rich phase, the resulting loss of ADA may be negligible. The liquid phase may be returned to the wash solution recycling system, preferably, together with the first solids rich phase.

If desired, a portion of the second mother liquid phase is recycled to the cooling crystallizer 7 through a line 13 for facilitating the transportation of the second mixture from the crystallizer 7 to the separator 10. Because the mother liquor is a saturated solution, the composition of the second solids phase does not change by such recycling.

The concentration of the first liquid phase may be controlled, if necessary, by the addition of water through a line 8 before it enters into the crystallizer 7. Such control water is, however, not normally used.

In the recycling wash solution, sodium thiocyanate also forms where hydrogen cyanide is contained in the hydrogen sulfide-containing gas to be treated. Since the generation of the thiocyanate is generally small in amount, it will not be accumulated in the wash solution system in the process of the present invention, a portion of the isocyanate being contained in the second solids rich phase and removed through the line 11.

EXAMPLE

A portion of the recirculating wash solution in a Stretford desulfurization process was bled off through the line 1 at a rate of 7.99 kg/min to subject the effluent to the treatment as shown in the drawing. In the desulfurization process, 123 g/min of sodium sulfate were being freshly produced. No control water was fed (line 8) and no recycling of a portion of the second mother liquid (line 13) was conducted. The effluent salt solution had the composition as shown in table below and had sodium ion concentration of 5.96 g-moles/Kg $H_2O$.

1st PRECIPITATION STAGE

The salt solution was concentrated in the vacuum crystallizer 2 to evaporate water at a rate of 3.78 kg/min. The resulting mixture was separated into a first solids rich phase and the first mother liquid phase at a temperature of $30°$ C. The first liquid phase had the composition shown in the table and a sodium ion concentration of 10.90 g-moles/Kg $H_2O$. The solubility of ADA in the first liquid phase is about $4.2 \times 10^{-3}$ g-moles/Kg $H_2O$. The first solids rich phase was in the form of cake containing about 33% by weight of the mother liquid and having the composition shown in the table. The cake was withdrawn through the line 3 at a rate of 1.50 kg/min and was returned to the wash solution recycling system through the line 4.

About 87% of ADA and 16% of $NaVO_3$ and chelating agent were thus recovered in the first precipitation treatment.

2nd PRECIPITATION STAGE

The first liquid phase was then introduced into the crystallizer 7 through the line 6 at a rate of 2.71 kg/min, where it was cooled to $0°$ C. to give a second mixture containing crystals of $Na_2SO_4 \cdot 10H_2O$ and $Na_2S_2O_3 \cdot 5H_2O$ and having the composition and the sodium ion concentration shown in the table. Since the solubility of ADA in the mother liquor of the second mixture (i.e., in the second mother liquid phase) increases to about $5 \times 10^{-3}$ g-moles/Kg $H_2O$), ADA did not precipitate.

The second mixture was then separated at the separator 10 into a second solids rich phase and a second mother liquid phase, each of which had the composition shown in the table.

The second solids rich phase containing about 10 wt% of the mother liquor was withdrawn at a rate of 0.453 Kg/min.

Thus, 123.2 g/min of $Na_2SO_4$ and 99.8 g/min of $Na_2S_2O_3$ were removed from the effluent salt solution, which amount was comparable to the amount of such inactive salts produced per unit time at the wash solution recycling system.

The second mother liquid phase was returned to the wash solution recycling system through the line 4. The overall recovery rate of ADA was thus 99.7%.

In the Table, the letter A indicates the effluent salt solution, B the first solids rich phase, C the first mother liquid phase, D water evaporated at the concentrating stage, E the second mixture F the second solids rich phase, and G the second liquid phase.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

| | | ADA | NaVO₃ | Chelating agent | NaHCO₃ | Na₂CO₃ | NaSCN | Na₂SO₄ | Na₂SO₄·10H₂O | Na₂S₂O₃ | Na₂S₂O₃·5H₂O | H₂O | Total | Na⁺ g mole/kg H₂O | Flow rate kg/min |
|---|---|---|---|---|---|---|---|---|---|---|---|---|---|---|---|
| A | g/l | 3.0 | 4.3 | 3.3 | 22.8 | 6.1 | 2.2 | 200.0 | — | 180.0 | — | 935.0 | 1356.7 | 5.96 | 7.99 |
| B | S* wt% | 0.22 | 0.32 | 0.24 | 1.68 | 0.45 | 0.16 | 14.74 | — | 13.27 | — | 68.92 | 100 | — | — |
| | S* wt% | 0.99 | — | — | — | — | — | 65.68 | — | — | — | — | 100 | — | 1.50 |
| | L** wt% | 0.03 | 0.26 | 0.20 | 1.39 | 0.37 | 0.13 | 1.97 | — | 11.10 | — | 17.96 | 100 | — | |
| | L** wt% | 0.09 | 0.79 | 0.60 | 4.19 | 1.12 | 0.40 | 5.91 | — | 33.03 | — | 53.86 | 100 | 10.90 | |
| C | wt% | — | — | — | — | — | — | — | 10.26 | — | 4.95 | 46.33 | — | — | 2.71 |
| D | wt% | 0.09 | 0.79 | 0.60 | 4.19 | 1.12 | 0.40 | 1.38 | 61.35 | 29.88 | 29.57 | 4.97 | 100 | — | 3.78 |
| E | wt% | 0.01 | 0.09 | 0.07 | 0.44 | 0.12 | 0.04 | 0.14 | — | 3.20 | — | — | 100 | — | 2.71 |
| F | wt% | 0.10 | 0.93 | 0.71 | 4.94 | 1.32 | 0.48 | 1.63 | — | 35.24 | — | 54.64 | 100 | 10.44 | 0.453 |
| G | wt% | | | | | | | | | | | | | | 2.25 |

*S : Solids portion of the first solid rich phase.
**L : Liquid portion of the first solid rich phase.

What is claimed is:

1. In a process for treating a hydrogen sulfide-containing gas, in which said gas is washed with an alkali wash solution to absorb said hydrogen sulfide as hydrosulfide, the solution containing hydrosulfide being oxidized using an oxidizer-anthraquinone disulfonate system to convert said hydrosulfide into elemental sulfur, said elemental sulfur being removed therefrom to obtain a salt solution comprising sulfur compounds and the disulfonate, the improvement comprising:
   a first stage wherein at least a portion of said salt solution is concentrated so as to form a concentrate having a sodium ion concentration of at least about 9 g.mol/Kg $H_2O$, the disulfonate being allowed to precipitate from said concentrate at a temperature of about 25° to 90° C. to form a first mixture, said first mixture being separated into a first solids rich phase containing said precipitated disulfonate and a first mother liquid phase; and
   a second stage wherein said first liquid phase is cooled to a temperature not higher than 10° C. to allow the sulfur compounds to precipitate to form a second mixture, said second mixture being separated into a second solids rich phase containing said precipitated sulfur compounds and a second liquid phase.

2. The process as claimed in claim 1, further comprising recycling said first solid rich phase to said alkali wash solution.

3. The process as claimed in claim 1, further comprising washing said first solids rich phase with water in an amount sufficient to dissolve said precipitated disulfonate to form a third mixture, separating said third mixture into a third solids rich phase and a third liquid phase, and recycling said third liquid phase to said alkali wash solution.

4. The process as claimed in 1, 2 or 3, further comprising recycling said second liquid phase to said alkali wash solution.

5. The process as claimed in claim 1, wherein said separation of said first mixture is conducted by centrifuge.

6. The process as claimed in claim 1, wherein said precipitation in said first stage is effected at a temperature in the range of from 30° to 40° C.

7. The process as claimed in claim 1, wherein said precipitation in said second stage is effected at a temperature in the range of from 0° to 5° C.

* * * * *